(12) United States Patent
Bjorkengren

(10) Patent No.: US 11,827,118 B1
(45) Date of Patent: Nov. 28, 2023

(54) SYSTEMS FOR ELECTRIC VEHICLE CHARGE PAYMENT

(71) Applicant: Geotab Inc., Oakville (CA)

(72) Inventor: Ulf Bjorkengren, Helsingor (DK)

(73) Assignee: Geotab Inc., Oakville (CA)

(*) Notice: Subject to any disclaimer, the term of this patent is extended or adjusted under 35 U.S.C. 154(b) by 0 days.

(21) Appl. No.: 17/993,059

(22) Filed: Nov. 23, 2022

Related U.S. Application Data

(60) Provisional application No. 63/420,728, filed on Oct. 31, 2022.

(51) Int. Cl.
| | |
|---|---|
| *B60L 53/66* | (2019.01) |
| *G06Q 20/04* | (2012.01) |
| *G06Q 20/32* | (2012.01) |

(52) U.S. Cl.
CPC .......... *B60L 53/665* (2019.02); *G06Q 20/047* (2020.05); *G06Q 20/325* (2013.01)

(58) Field of Classification Search
None
See application file for complete search history.

(56) References Cited

U.S. PATENT DOCUMENTS

| | | | |
|---|---|---|---|
| 2011/0099144 A1* | 4/2011 | Levy | B60L 53/30 709/227 |
| 2012/0191242 A1* | 7/2012 | Outwater | H04L 63/0823 700/236 |
| 2018/0118045 A1* | 5/2018 | Gruzen | B60L 53/665 |

FOREIGN PATENT DOCUMENTS

| | | | | |
|---|---|---|---|---|
| KR | 20180120405 A | * | 11/2018 | |
| WO | WO-2011044543 A2 | * | 4/2011 | B60L 53/30 |

OTHER PUBLICATIONS

Machine translation of KR-20180120405-A (Year: 2023).*

* cited by examiner

*Primary Examiner* — David V Henze-Gongola
(74) *Attorney, Agent, or Firm* — Mark J. Pringle-Rigby

(57) ABSTRACT

The present systems, devices, and methods relate to managing vehicle battery charging. Payment for charging is preauthorized, and a receipt for preauthorization is sent from a payment management device to a user device when the user device has access to internet or cellular communications. This preauthorization receipt is later sent from the user device to a charge station where internet or cellular communication is not available, to enable charging of the vehicle battery at the charge station. Another receipt is sent from the charge station to the user device after charging of the vehicle, indicating a payment amount for actual energy used to charge the battery. Later, when the user device has access to cellular or internet communications, the user device sends the receipt indicating payment amount for actual energy used to the payment management device, for final payment balancing.

15 Claims, 7 Drawing Sheets

SYSTEMS FOR ELECTRIC VEHICLE CHARGE PAYMENT

RELATED APPLICATION DATA

This application claims priority to U.S. Provisional Patent Application No. 63/420,728 titled "Systems, Devices, and Methods for Electric Vehicle Charge Payment", filed on Oct. 31, 2022, the entirety of which is incorporated by reference herein.

TECHNICAL FIELD

The present disclosure generally relates to systems, devices, and methods for managing vehicle payment, and in particular relates to managing payment for electric vehicle charging.

BACKGROUND

Battery-powered vehicles (e.g. all-electric vehicles, hybrid electric vehicles, etc.) are a convenient and environmentally friendly means of transportation. In the present context, a battery-powered vehicle includes at least one battery, which can be charged from an external power source or charging station, or by in-vehicle components like regenerative brakes. A battery-powered vehicle can alternately be called an "electric vehicle".

SUMMARY

According to a broad aspect, the present disclosure describes a user device to facilitate charging of a vehicle battery, the user device comprising: at least one communication interface; at least one processor communicatively coupled to the at least one communication interface; and at least one non-transitory processor-readable storage medium communicatively coupled to the at least one processor, the at least one non-transitory processor-readable storage medium storing processor-executable instructions which, when executed by the at least one processor, cause the user device to: within a first time period: predict, by the at least one processor, a first quantity of energy for charging the vehicle battery; send, by the at least one communication interface, a request for payment preauthorization for the first quantity of energy, to be received by a payment management device; receive, by the at least one communication interface from the payment management device, a first signed receipt indicating availability of a first quantity of funds to purchase the first quantity of energy; and store, by the at least one non-transitory processor-readable storage medium, the first signed receipt; within a second time period subsequent the first time period: send, by the at least one communication interface, the first signed receipt to a charge station to initiate charging of the vehicle battery by the charge station; and after charging of the vehicle battery, receive, by the at least one communication interface from the charge station, a second signed receipt indicating a second quantity of funds to purchase a second quantity of energy used to charge the vehicle battery; and within a third time period subsequent the second time period: send, by the at least one communication interface, the second signed receipt to the payment management device.

The second quantity of funds may be limited to be equal to or less than the first quantity of funds. The second quantity of funds may be limited to be within a trust threshold of the first quantity of funds.

The second quantity of energy may be a quantity of energy in excess of the first quantity of energy; and the second signed receipt may indicate a difference between the first quantity of funds and the second quantity of funds.

The second quantity of energy may be a total quantity of energy used to charge the vehicle battery; and the second signed receipt may indicate the second quantity of funds to purchase the total quantity of energy used to charge the vehicle battery.

The processor-executable instructions may cause the user device to predict the first quantity of energy and send the request for payment preauthorization automatically in response to a charge level of the vehicle battery being below a charge threshold.

The processor-executable instructions may cause the user device to predict the first quantity of energy and send the request for payment preauthorization automatically in response to the user device receiving a user input indicating intention to charge the vehicle battery.

The processor-executable instructions may cause the user device to predict the first quantity of energy and send the request for payment preauthorization automatically on a periodic basis.

The first signed receipt may have an expiration time. The processor-executable instructions may cause the user device to predict the first quantity of energy again and send the request for payment preauthorization again automatically after the expiration time of the first signed receipt. The processor-executable instructions may cause the user device to predict the first quantity of energy again, and send the request for payment preauthorization again, automatically prior to the expiration time of the first signed receipt.

The user device may further comprise a user interface, and the processor-executable instructions may further cause the user device to, prior to sending the second signed receipt: present, by the user interface, a notification instructing a user of the user device to enable sending of the second signed receipt.

During the first time period and the third time period it may be possible for the user device to communicate with the payment management device over at least one communication network; and during the second time period it may not possible for the user device to communicate with the payment management device over the at least one communication network.

The processor-executable instructions may further cause the user device to: during the second time period, receive by the at least one communication interface from the charge station, a status message; and during the third time period, send by the at least one communication interface to the payment management device, the status message. The status message may indicate a firmware or software version of at least one module of the charge station. The status message may indicate energy available at the charge station.

According to another broad aspect, the present disclosure describes a method for charging a vehicle battery, the method comprising: during a first time period: predicting, by at least one processor of a user device, a first quantity of energy for charging the vehicle battery; sending, by a communication interface of the user device, a request for payment preauthorization to a payment management device; receiving, by the communication interface of the user device, a first signed receipt indicating that a first quantity of funds are available to purchase the first quantity of energy; and storing, by at least one non-transitory processor-readable storage medium of the user device, the first signed receipt; during a second time period subsequent the first time period: sending, by the communication interface of the user device, the first signed receipt to a charge station; and after charging of the vehicle battery, receiving, by the communication interface of the user device from the charge station, a second signed receipt indicating a second quantity of funds to purchase a second quantity of energy used to charge the vehicle battery; and during a third time period subsequent the first time period: sending, by the communication interface of the user device, the second signed receipt to the payment management device.

The second quantity of funds may be limited to be equal to or less than the first quantity of funds. The second quantity of funds may be limited to be within a trust threshold of the first quantity of funds.

The second quantity of energy may be a quantity of energy in excess of the first quantity of energy; and the second signed receipt may indicate a difference between the first quantity of funds and the second quantity of funds.

The second quantity of energy may be a total quantity of energy used to charge the vehicle battery; and the second signed receipt may indicate the second quantity of funds to purchase the total quantity of energy used to charge the vehicle battery.

Predicting the first quantity of energy and sending the request for payment preauthorization may be performed automatically in response to the user device receiving an indication of a charge level of the vehicle battery being below a charge threshold.

Predicting the first quantity of energy and sending the request for payment preauthorization may be performed automatically in response to the user device receiving a user input indicating intention to charge the vehicle battery.

Predicting the first quantity of energy and sending the request for payment preauthorization may be performed automatically on a periodic basis.

The first signed receipt may have an expiration time. Predicting the first quantity of energy and sending the request for payment preauthorization may be performed again automatically after the expiration time of the first signed receipt. The method may further comprise, automatically prior to the expiration time of the first signed receipt: predicting the first quantity of energy again; and sending the request for payment preauthorization again.

The method may further comprise, prior to sending the second signed receipt: presenting, by a user interface of the user device, a notification instructing a user of the user device to enable sending of the second signed receipt.

During the first time period and the third time period it may be possible for the user device to communicate with the payment management device over at least one communication network; and during the second time period it may not possible for the user device to communicate with the payment management device over the at least one communication network.

The method may further comprise: during the second time period, receiving by the at least one communication interface of the user device from the charge station, a status message; and during the third time period, sending by the at least one communication interface of the user device to the payment management device, the status message. The status message may indicate a firmware or software version of at least one module of the charge station. The status message may indicate energy available at the charge station.

According to yet another broad aspect, the present disclosure describes a system for charging a vehicle battery, the system comprising: a payment management device comprising a first communication interface, at least one first processor, and at least one first non-transitory processor-readable storage medium communicatively coupled to the at least one first processor, the at least one first non-transitory processor-readable storage medium storing first processor-executable instructions which, when executed by the at least one first processor, cause the payment management device to: receive, by the first communication interface from a user device, a request for payment preauthorization for a first quantity of energy; determine, by the at least one first processor, that a first quantity of funds to purchase the first quantity of energy are available for an account associated with the user device; and send, by the first communication interface, a first signed receipt indicating that the first quantity of funds are available to purchase the first quantity of energy, to be received by the user device; and a charge station comprising a second communication interface, at least one second processor, and at least one second non-transitory processor-readable storage medium communicatively coupled to the at least one second processor, the at least one second non-transitory processor-readable storage medium storing second processor-executable instructions which, when executed by the at least one second processor, cause the charge station to: receive, by the second communication interface, the first signed receipt from the user device; provide, via a power coupling, energy to the vehicle battery; determine, by the at least one second processor, a second quantity of funds to purchase a second quantity of energy provided to the vehicle battery; and send, by the second communication interface to the user device, a second signed receipt indicating the second quantity of funds to purchase the second quantity of energy to charge the vehicle battery, wherein the first processor-executable instructions further cause the payment management device to: after the vehicle battery is charged by the charge station, receive, by the first communication interface, the second signed receipt indicating the second quantity of funds to purchase the second quantity of energy used to charge the vehicle battery; and balance the second quantity of funds to the account associated with the user device.

The second quantity of funds may be limited to be equal to or less than the first quantity of funds. The second quantity of funds may be limited to be within a trust threshold of the first quantity of funds.

The second quantity of energy may be a quantity of energy in excess of the first quantity of energy; and the second signed receipt may indicate a difference between the first quantity of funds and the second quantity of funds. The first processor-executable instructions may further cause the payment management device to charge the first quantity of funds to the account associated with the user device; and the first processor executable instructions which cause the payment management device to balance the second quantity of funds to the account associated with the user device may cause the payment management device to charge the second quantity of funds to the account associated with the user device.

The second quantity of energy may be a total quantity of energy used to charge the vehicle battery; and the second signed receipt may indicate the second quantity of funds to purchase the total quantity of energy used to charge the vehicle battery. The first processor-executable instructions which cause the payment management device to balance the second quantity of funds to the account associated with the user device may cause the payment management device to charge the second quantity of funds to the account associated with the user device. The first processor-executable instructions may further cause the payment management device to release the first quantity of funds to the account associated with the user device.

The second quantity of energy may be a total quantity of energy used to charge the vehicle battery and may be less than the first quantity of energy; and the second signed receipt may indicate a difference between the first quantity of funds and the second quantity of funds. The first processor-executable instructions may further cause the payment management device to charge the first quantity of funds to the account associated with the user device; and the first processor executable instructions which cause the payment management device to balance the second quantity of funds to the account associated with the user device may cause the payment management device to reimburse the second quantity of funds to the account associated with the user device.

The first signed receipt may have an expiration time.

It may not be possible for the payment management device to communicate with the charge station in real-time over at least one communication network.

The first processor-executable instructions which cause the first communication interface to receive the second signed receipt may cause the first communication interface to receive the second signed receipt from the user device.

The second processor-executable instructions may further cause the charge station to: store, by the at least one second non-transitory processor-readable storage medium, the second signed receipt; and send, by the second communication interface, the second signed receipt to another user device, and the first processor-executable instructions which cause the first communication interface to receive the second signed receipt may cause the first communication interface to receive the second signed receipt from the other user device.

The first processor-executable instructions may further cause the payment management device to: determine, by the at least one first processor, that the second signed receipt has not been received by the payment management device from the user device after a time period since issuance of the first signed receipt; and send, by the first communication interface, a query instruction to the other user device which causes the other user device to send a query to the charge station, and the second processor-executable instructions may further cause the charge station to, prior to the payment management device receiving the second signed receipt from the other user device: receive, by the second communication interface, the query from the other user device; and send, by the second communication interface, the second signed receipt to the other user device in response to the query.

The second processor-executable instructions may further cause the charge station to, during the second time period, send by the second communication interface to the user device, a status message; and the first processor-executable instructions may further cause the payment management device to, during the third time period, receive by the first communication interface from the user device, the status message. The status message may indicate a firmware or software version of at least one module of the charge station; in response to the firmware or software version being out of date, the first processor executable instructions may further cause the payment management device to send a firmware or software update file to the user device; the second processor-executable instructions may further cause the charge station to: receive, by the second communication interface, the update file; and install, by the at least one second processor, the update file to the charge station. The status message may indicate energy available at the charge station.

According to yet another broad aspect, the present disclosure describes a method for charging a vehicle battery, the method comprising: receiving, by a first communication interface of a payment management device, from a user device, a request for payment preauthorization for a first quantity of energy; determining, by at least one first processor of the payment management device, that a first quantity of funds to purchase the first quantity of energy are available for an account associated with the user device; sending, by the first communication interface, a first signed receipt indicating that the first quantity of funds are available to purchase the first quantity of energy, to the user device; receiving, by a second communication interface of a charge station, the first signed receipt from the user device; providing, via a power coupling of the charge station, energy to the vehicle battery; determining, by at least one second processor of the charge station, a second quantity of funds to purchase a second quantity of energy provided to the vehicle battery; sending, by the second communication interface to the user device, a second signed receipt indicating the second quantity of funds to purchase the second quantity of energy to charge the vehicle battery; after the vehicle battery is charged by the charge station, receiving, by the first communication interface, the second signed receipt indicating the second quantity of funds to purchase the second quantity of energy used to charge the vehicle battery; and balancing the second quantity of funds to the account associated with the user device.

The second quantity of funds may be limited to be equal to or less than the first quantity of funds. The second quantity of funds may be limited to be within a trust threshold of the first quantity of funds.

The second quantity of energy may be a quantity of energy in excess of the first quantity of energy; and the second signed receipt may indicate a difference between the first quantity of funds and the second quantity of funds. The method may further comprise charging, by the at least one first processor of the payment management device, the first quantity of funds to the account associated with the user device, and balancing the second quantity of funds to the account associated with the user device may comprise charging the second quantity of funds to the account associated with the user device.

The second quantity of energy may be a total quantity of energy used to charge the vehicle battery; and the second signed receipt may indicate the second quantity of funds to purchase the total quantity of energy used to charge the vehicle battery. Balancing the second quantity of funds to the account associated with the user device may comprise charging the second quantity of funds to the account associated with the user device. The method may further comprise releasing, by the at least one first processor of the payment management device, the first quantity of funds to the account associated with the user device.

The second quantity of energy may be a total quantity of energy used to charge the vehicle battery and may be less than the first quantity of energy; and the second signed receipt may indicate a difference between the first quantity of funds and the second quantity of funds. The method may further comprise charging, by the at least one first processor of the payment management device, the first quantity of funds to the account associated with the user device, and balancing the second quantity of funds to the account associated with the user device may comprise reimbursing, by the at least one first processor, the second quantity of funds to the account associated with the user device.

The first signed receipt may have an expiration time.

It may not be possible for the payment management device to communicate with the charge station in real-time over at least one communication network.

Receiving the second signed receipt by the first communication interface may comprise receiving the second signed receipt from the user device.

The method may further comprise: storing, by at least one second non-transitory processor-readable storage medium of the charge station, the second signed receipt; and sending, by the second communication interface, the second signed receipt to another user device, and receiving the second signed receipt by the first communication interface may comprise receiving the second signed receipt from the other user device. The method may further comprise: determining, by the at least one first processor, that the second signed receipt has not been received by the payment management device from the user device after a time period since issuance of the first signed receipt; sending, by the first communication interface, a query instruction to the other user device which causes the other user device to send a query to the charge station; and prior to the payment management device receiving the second signed receipt from the other user device: receiving, by the second communication interface, the query from the other user device; and sending, by the second communication interface, the second signed receipt to the other user device in response to the query.

The method may further comprise: during the second time period, sending by the second communication interface to the user device, a status message; and during the third time period, receiving by the first communication interface from the user device, the status message. The status message may indicate a firmware or software version of at least one module of the charge station, and the method may further comprise: in response to the firmware or software version being out of date, sending by the first communication interface a firmware or software update file to the user device; receiving, by the second communication interface, the update file; and installing, by the at least one second processor, the update file to the charge station. The status message may indicate energy available at the charge station.

BRIEF DESCRIPTION OF THE DRAWINGS

Exemplary non-limiting embodiments are described with reference to the accompanying drawings in which.

DETAILED DESCRIPTION

The present disclosure details systems, methods, and devices for managing payment for vehicle charging.

A charge station may not have access to a communication network (e.g. an internet or cellular network), whether temporarily or permanently. For example, the charge station may be outside a service area of available communication networks. The present systems, devices, and methods provide a means for such a charge station to accept electronic payment. In particular, a user device communicates with a payment management device to preauthorize payment for charging prior to leaving a communication network service area. After leaving the service area and approaching the charge station, the user device communicates with the charge station and charges a vehicle battery based on the payment preauthorization. Final payment information is provided to the user device from the charge station, based on actual energy used for charging. After returning to the service area (or entering another service area), the user device communicates the final payment information to the payment management device, for balancing the user's account.

Figure 1:
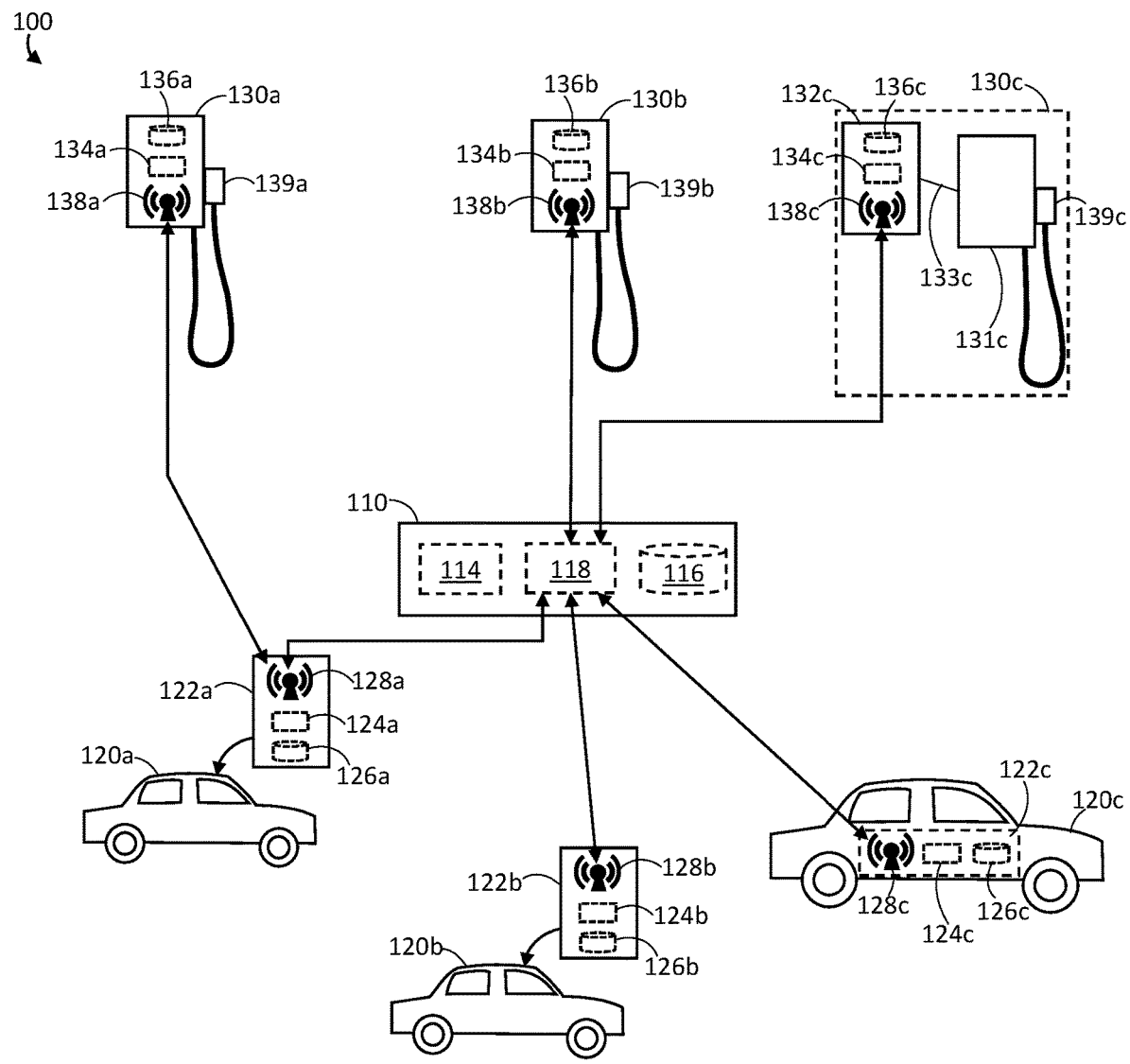
FIG. 1 is a schematic view of a system for managing vehicle battery charging.

FIG. 1 is a schematic view of a system 100 for managing payment for vehicle charging. FIG. 1 shows a payment management device 110, which includes at least one processor 114, at least one non-transitory processor-readable storage medium 116, and a communication interface 118. Although illustrated as one device, payment management device 110 can include a plurality of devices, a plurality of processors 114, a plurality of non-transitory processor-readable storage mediums 116, and/or a plurality of communication interfaces 118. In this sense, payment management device 110 can itself be called a "system". Further, such a plurality of payment management devices or a payment management system can be in close proximity (e.g. in a central server location), or can be distributed across different locations (e.g. as remote devices). Communication interface 118 can be a wired or wireless interface, through which payment management device 110 communicates with other devices, such as a plurality of vehicles, vehicle devices, or user devices.

In the illustrated example, payment management device 110 is shown as communicating with user devices at three vehicles 120a, 120b, and 120c (collectively referred to as vehicles 120). However, payment management device 110 could communicate with user devices at any appropriate number of vehicles, such as one vehicle, dozens of vehicles, hundreds of vehicles, thousands of vehicles, or even more vehicles.

At vehicle 120a is positioned user device 122a, which includes at least one processor 124a, at least one non-transitory processor-readable storage medium 126a, and a communication interface 128a. At vehicle 120b is positioned user device 122b, which includes at least one processor 124b, at least one non-transitory processor-readable storage medium 126b, and a communication interface 128b. At vehicle 120c is positioned user device 122c, which includes at least one processor 124c, at least one non-transitory processor-readable storage medium 126c, and a communication interface 128c.

Collectively, vehicle 120*a*, vehicle 120*b*, and vehicle 120*c* can be referred to as "vehicles 120". Collectively, the at least one processor 124*a*, the at least one processor 124*b*, and the at least one processor 124*c* can be referred to as "processors 124". Collectively, the at least one non-transitory processor-readable storage medium 126*a*, the at least one non-transitory processor-readable storage medium 126*b*, and the at least one non-transitory processor-readable storage medium 126*c* can be referred to as "non-transitory processor-readable storage mediums 126". Collectively, communication interface 128*a*, communication interface 128*b*, and communication interface 128*c* can be referred to as "communication interfaces 128". Collectively, user device 122*a*, user device 122*b*, and user device 122*c* can be referred to as "user devices 122".

Each of "user devices 122" can be a device partnered or associated with a user, such as a smartphone, PDA, digital assistant, or other appropriate device. Each of user devices 122 can be a device partnered or associated with a particular vehicle 120 (e.g. by being installed in said vehicle). Such user devices associated with a vehicle can be aftermarket devices (e.g. a device which electrically couples to an accessible port of the vehicle), or can be installed in the vehicle during manufacture of the vehicle (e.g. a device integrated in the vehicle electronics, such as integrated with an infotainment system of the vehicle). In some implementations, a user device 122 is associated with a particular user, and with a particular vehicle. For example, a user device 122 installed in a particular vehicle 120 is registered to an account belonging to a user who owns or operates the particular vehicle 120.

Each of user devices 122 can be a monolithically packaged device (i.e. a device contained in a single housing). However, this is not necessarily the case, and each user device 122 can refer to a collection of components installed in a vehicle (i.e. they do not have to be packaged in a single housing). Further, components of any of the user devices 122 can be multi-purpose components which serve other functions within the vehicle. As an example, a user device 122 can comprise components of an infotainment system of the vehicle (e.g. display and user input interface), while also comprising other components of the vehicle (e.g. communication antenna or at least one processor).

Each of user devices 122 communicates with payment management device 110 via communication interfaces 128 and 118. In some implementations, such communication is direct. In other implementations, such communication is indirect. For example, communication between a user device 122 and payment management device can be conducted through a communications network or a plurality of communications networks, such as a telecommunication or cellular network, or an internet network, as non-limiting examples. In one exemplary implementation, a vehicle device 122 communicates with a cellular service provider (e.g. a cellular service tower), which in turn communicates with an internet service provider for the payment management device 110, such that the vehicle device 122 and the payment management device 110 communicate with each other indirectly.

System 100 is also illustrated in FIG. 1 as including three charge stations 130*a*, 130*b*, and 130*c* (collectively, charge stations 130). Any appropriate number of charge stations could be included in system 100, such as one charge station, two charge stations, dozens of charge stations, hundreds of charge stations, thousands of charge stations, or even more charge stations.

Charge station 130*a* is shown as including at least one processor 134*a*, at least one non-transitory processor-readable storage medium 136*a*, communication interface 138*a*, and energy couple 139*a*. Charge station 130*b* is shown as including at least one processor 134*b*, at least one non-transitory processor-readable storage medium 136*b*, communication interface 138*b*, and energy couple 139*b*. Charge station 130*c* is shown as including a charge head 131*c*, having energy couple 139*c* for providing energy to a vehicle. Charge station 130*c* is further shown as including a secondary device 132*c* communicatively coupled to charge head 131*c* via communication pathway 133*c*. The secondary device 132*c* as shown includes at least one processor 134*c*, at least one non-transitory processor-readable storage medium 136*c*, and communication interface 138*c*.

Collectively, the at least one processor 134*a*, the at least one processor 134*b*, and the at least one processor 134*c* can be referred to as "processors 134". Collectively, the at least one non-transitory processor-readable storage medium 136*a*, the at least one non-transitory processor-readable storage medium 136*b*, and the at least one non-transitory processor-readable storage medium 136*c* can be referred to as "non-transitory processor-readable storage mediums 136". Collectively, communication interface 138*a*, communication interface 138*b*, and communication interface 138*c* can be referred to as "communication interfaces 138". Collectively, energy couple 139*a*, energy couple 139*b*, and energy couple 139*c* can be referred to as "energy couples 139".

Communication interfaces 138 are any appropriate wired or wireless interface for communication with other devices.

Energy couples 139 are means for connecting a respective charge station 130 to a respective vehicle 120, so as to provide power to the vehicle 120 for charging a battery of the vehicle 120. Energy couples 139 can comprise any appropriate plug or electrical interface for electrically connecting a charge station 130 to a vehicle 120, such as a plug which utilizes the J1772™, TESLA®, Mennekes®, GB/T, CCS1, CHAdeMO®, CCS2 plug standards, as non-limiting examples.

Charge stations 130*a* and 130*b* are shown as having processor, processor-readable storage media, and communication interfaces built together with a charge head. In this way, charge stations 130*a* and 130*b* comprise monolithic charge heads which can perform processing, data storage, and communication independent of other devices. Charge station 130*c* on the other hand uses secondary device 132*c* to perform processing, data storage, and communication. In some implementations, a plurality of charge heads can be communicatively coupled with a secondary device or server, which performs processing, data storage, and communication for the plurality of charge heads. In an exemplary scenario, a charging center includes a plurality of charge heads 131*c* for charging a plurality of vehicle batteries simultaneously, and each of said charge heads 131*c* is communicatively coupled to a common secondary device 132*c* for processing, data storage, and communication functions.

In FIG. 1, charge station 130*b* and charge station 130*c* (via secondary device 132*c*) are shown communicating with payment management device 110. Such a configuration enables live payment management at a respective charge station 130. For example, a user can couple their vehicle to charge station 130*b* via energy couple 139*b*, and initiate a payment process at the charge station 130*b*. In turn, the charge station 130*b* communicates with payment management device 110 to authenticate or verify payment (e.g. via a credit card or charge account). If payment is verified, charging by the charge station 130b is carried out. Similar discussion applies to charge station 130c.

FIG. 1 also shows charge station 130a as not being in communication with payment management device 110. This could be temporary (e.g. internet or cellular connection could be temporarily down in a region where charge station 130a is located), or could be long-term (e.g. charge station 130a is installed in a location without access to communication infrastructure such as cellular towers or internet connectivity). In such cases, to carry out payment management, charge station 130a can communicate with payment management device 110 via a user device (illustrated as user device 122a in FIG. 1, though any user device could carry out payment management).

Managing a payment process based on communication via a user device can be performed live, provided the user device is able to communicate with payment management device 110. For example, an internet service provider which provides internet to charge station 130a may be temporarily out of service, but a cellular service that provides internet to user device 122a may still be in service. In such a case, a user can couple their vehicle to charge station 130a via energy couple 139a, and initiate a payment process via user device 122a (e.g. via an application associated with the charge provider). The user device 122a communicates with payment management device 110 to authenticate or verify payment (e.g. via a credit card or via an account associated with the user device). If payment is verified, a signed receipt is provided to user device 122a, which is in turn provided to charge station 130a via short-range communication (e.g. Bluetooth® or similar). Charge station 130a then provides energy to charge the vehicle battery via energy couple 139b.

Throughout this disclosure, the term "signed receipt" refers to a record of transaction that has been digitally signed (whether the transaction is completed or is preauthorized pending completion). The digital signature can be used to verify the authentication of the sender, and the integrity of the record of transaction. Exemplary signed receipts are discussed later with reference to FIGS. 8 and 9.

However, in some cases both a charge station and a user device may not have access to a communication network at a location of the charge station. In this context, it is desirable to enable payment to use a charge station, even when no communication with payment server 110 is possible from the location of said charging station. For example, it is desirable to enable payment management for a charge station installed at a location with no internet or cellular communication access (whether the lack of access is temporary or long-term).

In FIG. 1, several exemplary user devices and charge stations are illustrated, with specific communication paths illustrated between certain devices. However, in the present disclosure, any charge station can communicate with any user device, as appropriate in a given scenario or implementation. As one example, charge station 130a can communicate with user device 122c installed in vehicle 120c, via communication interfaces 138a and 128c. As another example, charge station 130c can communicate with user device 122a positioned at vehicle 120a, via communication interfaces 138c and 128a.

Figure 2:
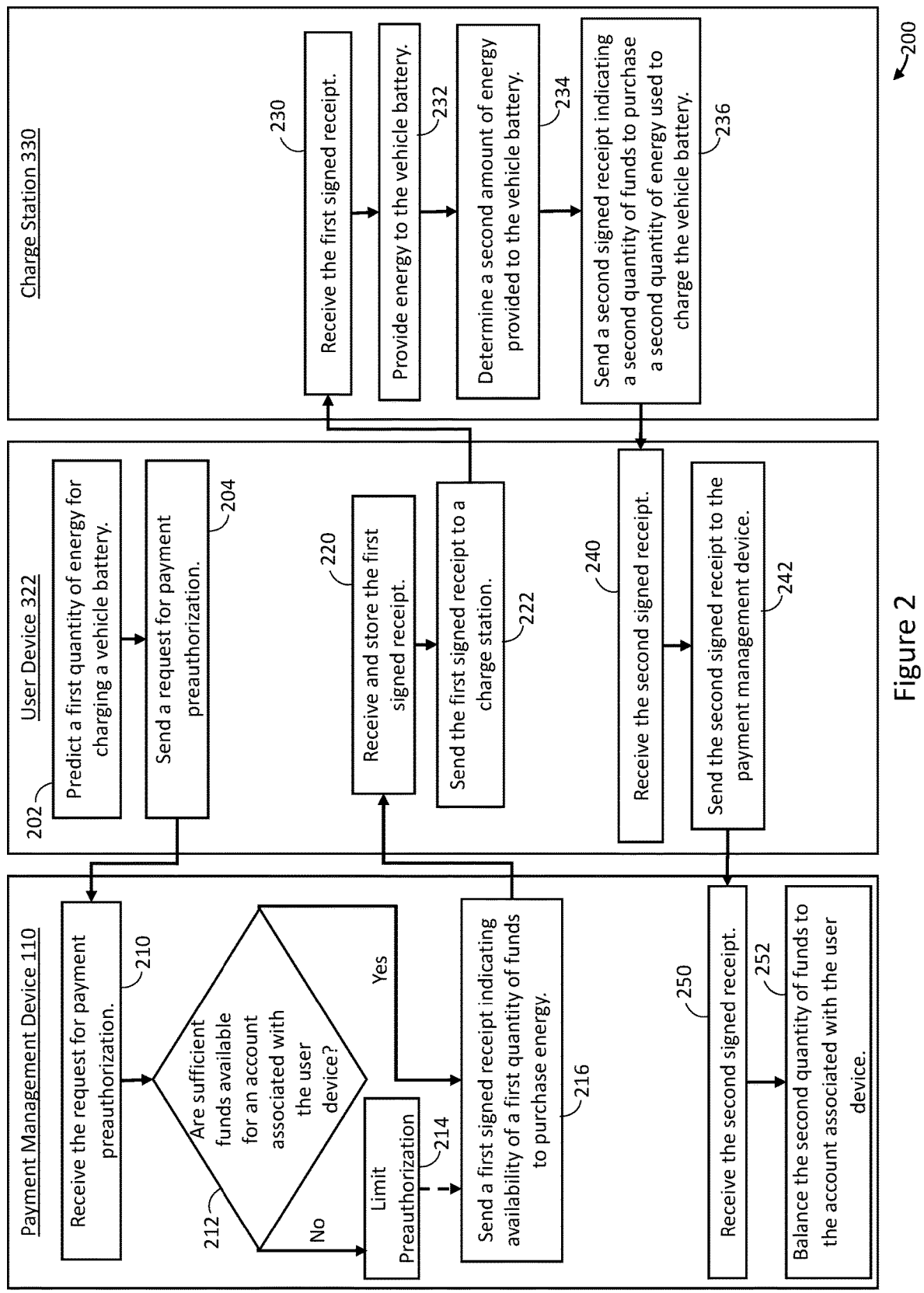
FIG. 2 is a flowchart diagram of a method for managing charging of a vehicle battery, in accordance with an exemplary illustrated implementation.

FIG. 2 is a flowchart diagram which illustrates an exemplary method 200 performed by devices such as those in FIG. 1. Method 200 as illustrated includes acts 202, 204, 210, 212, 214, 216, 220, 222, 230, 232, 234, 236, 240, 242, 250 and 252. One skilled in the art will appreciate that additional acts could be added, acts could be removed, or acts could be reordered as appropriate for a given application. With reference to the example illustrated in FIG. 1, acts can be performed by appropriate components of payment management device 110, user devices 122, and charge stations 130. In particular, FIG. 2 illustrates interaction and communication between payment management device 110, a user device 322 (which is similar to and can include components of any of the user devices 122 discussed with reference to FIG. 1), and charge station 330 (which is similar to and can include components of any of the charge stations 130 discussed with reference to FIG. 1). In this sense, any of the at least one non-transitory processor-readable storage mediums 116, 126, or 136 could have instructions stored thereon, which when executed by a respective at least one processor (processors 114, 124, or 134) cause the respective device (payment management device 110, user device 322, or charge station 330) to perform a given act of method 200. Method 200 is generally directed to managing payment for one charge event. Method 200 can be performed again or separately for other charge events, with a different charge station 330 and/or a different user device 322 if appropriate.

Figure 3:
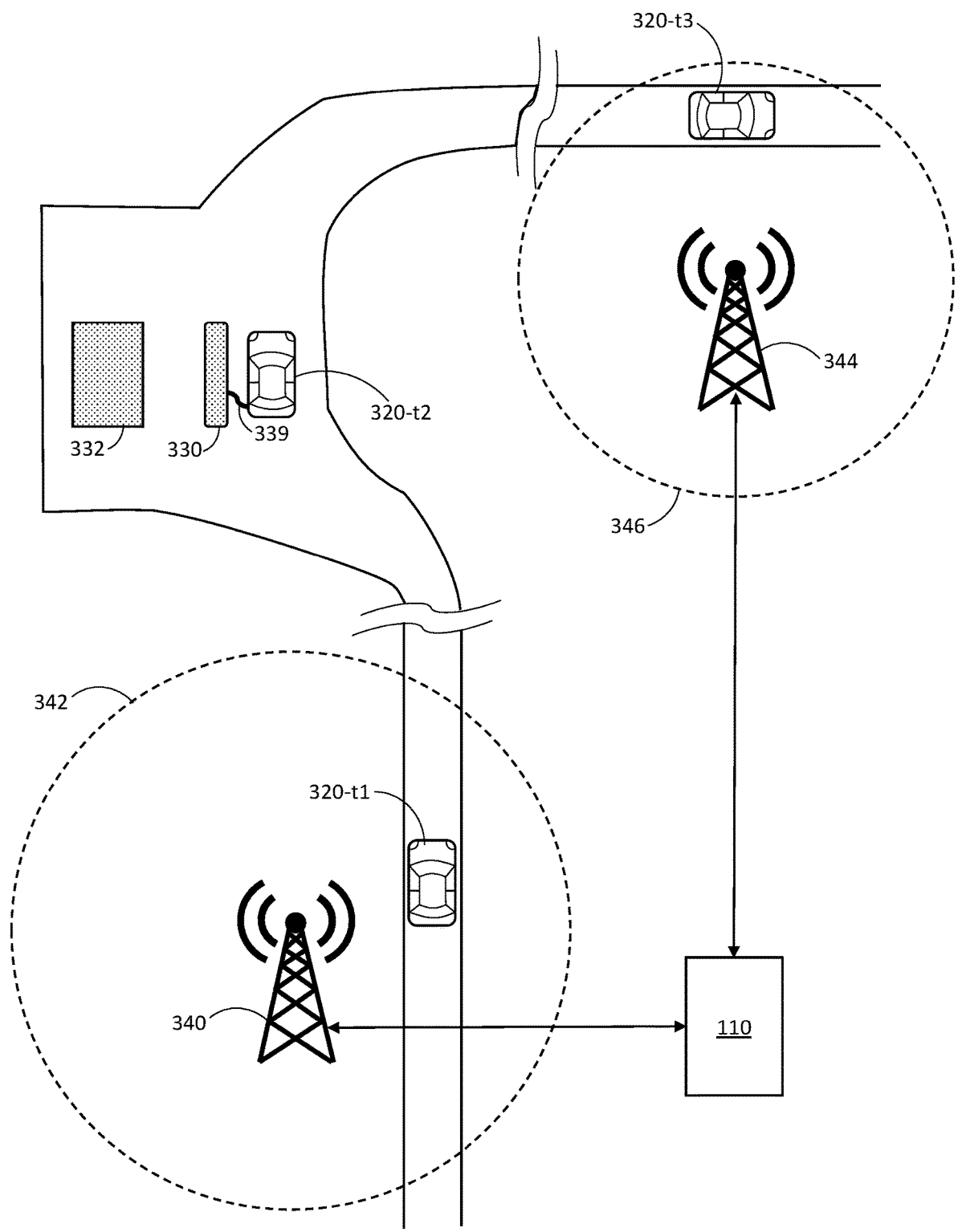
FIG. 3 is a top view of an exemplary scenario where a vehicle battery is charged in accordance with an exemplary illustrated implementation.

Method 200 in FIG. 2 is discussed with reference to an example scenario illustrated in FIG. 3. In particular, FIG. 3 is a top-view of a region where a vehicle 320 stops at a charge station 330 where internet or cellular connectivity is not available. Vehicle 320 carries a user device 322 (not shown in FIG. 3 to reduce clutter, but is shown in FIG. 2). Building 332 is illustrated proximate charge station 330, and could be for example a convenience store, rest-stop, restaurant, or any other appropriate venue. In cases where charge station 330 includes a secondary device (akin to secondary device 132c in FIG. 1), said secondary device could be positioned in building 332. Vehicle 320 is shown at three times t1, t2, and t3 (labeled as 320-t1, 320-t2, and 320-t3, respectively, in FIG. 3). At t1, cellular connectivity is available to vehicle 320 (and user device 322 thereat), because vehicle 320 is within a communication range 342 of a cellular communication tower 340. At t2 cellular connectivity is NOT available to vehicle 320 (and user device 322 thereat), because vehicle 320 is outside of communication range of any cellular communication towers. At t3 cellular connectivity is again available to vehicle 320 (and user device 322 thereat), because vehicle 320 is within a communication range 346 of cellular communication tower 344. FIG. 3 also illustrates payment management device 110, which is in communication with the communication network or networks of cellular communication towers 340 and 344 (either directly or indirectly). Because connectivity is available to vehicle 320 (and user device 322 thereat) at times t1 and t3, but not at time t2, user device 322 can communicate with payment management device 110 at times t1 and t3, but not time t2.

FIGS. 2 and 3 generally discuss a process by which payment for charging can be preauthorized at time t1, for subsequent charging at time t2, and final charging results are reported at time t3. In this regard, acts 202, 204, 210, 212, 214, 216, and 220 of method 200 occur at time t1; acts 222, 230, 232, 234, 236, and 240 occur at time t2; and acts 242, 250, and 252 occur at time t3. In this context, for acts to occur "at" a particular time does not require that the acts are all performed simultaneously in a single instant. Rather, each of time t1, time t2, and time t3 can comprise a time period during which respective acts of method 200 occur.

Method 200 begins at act 202, and can be initiated in a plurality of ways, for a plurality of reasons. In some scenarios, in anticipation of exiting a cellular service area, a user may provide input to the user device to request payment preauthorization for charging of the vehicle battery. The user could input, as examples, a desired amount of charge or a desired quantity of funds to preauthorize. In another example, the user could select a simple input which indicates the user's desire to charge the vehicle battery, and the quantity or energy for charging and funds amount are determined automatically. In other scenarios, method 200 could be initiated automatically in response to a charge level of the vehicle battery dropping below a minimum charge threshold, so that the user will be able to charge the vehicle battery even if they go out of a cellular or internet service area. In yet other scenarios, method 200 can be initiated automatically on a periodic basis, such that payment preauthorization is regularly maintained, ensuring the user has the ability to charge at charge stations outside of an internet or cellular service area.

At 202 in method 200, a first quantity of energy for charging a battery of a vehicle (vehicle 320 in FIG. 3) is predicted (by at least one processor of user device 322). Generally, it is desirable to predict how much energy is needed to charge the vehicle battery to a desired threshold (e.g. to full charge, to half charge, etc.). In some implementations, this can entail accessing charge level data for the vehicle battery (e.g. from a voltage sensor of the vehicle battery) which indicates a present amount of charge in the battery. The first quantity of energy can then be determined as a difference between the desired threshold energy and the present amount of charge in the battery. In some implementations, predicting the first quantity of energy includes estimating energy to be consumed by the vehicle to travel to a charge station (such as charge station 330). For example, using map and/or road data, the at least one processor of user device 322 can determine energy expected to be consumed by the vehicle 320 travelling to a particular charge station (e.g. the nearest charge station, or another charge station proximate a route to be travelled by the vehicle, charge station 330), based on any of distance to said charge station, speed of travel to said charge station, incline of roads to said charge station, weather conditions, or any other appropriate data. In other implementations, predicting the first quantity of energy can be kept simple, by determining the first quantity of energy as the maximum amount of energy the vehicle battery can hold (or is permitted to hold, for battery systems where the battery is deliberately not charged to maximum to extend life of the battery).

At 204, a request for payment preauthorization is sent to payment management device 110 (e.g. by a communication interface 138 of user device 322). At 210, the request for payment preauthorization is received by the payment management device 110 (e.g. by communication interface 118).

In some implementations, the request for payment preauthorization indicates the first quantity of energy; in other implementations, the request for payment preauthorization indicates a first quantity of funds to purchase the first quantity of energy, as determined by the at least one processor of user device 322. Due to fluctuating energy rates, user device 322 may not have up-to-date information on energy costs (especially for a charge station 330 outside an internet or cellular service area). As such, if the first quantity of funds to purchase the first quantity of energy is determined at user device 322, the first quantity of funds may not be accurate to purchase exactly the first quantity of energy. On the other hand, if the first quantity of funds to purchase the first quantity of energy is determined at payment management device 110 (by the at least one processor 114), the determined first quantity of funds is likely to be more accurate (or at least based on more up-to-date energy cost data), though this is not necessarily the case. Further, even a determination of the first quantity of funds at the payment management device 110 may not be completely accurate (especially for a charge station outside and internet or cellular service area). Nonetheless, the first quantity of funds will typically be sufficient to purchase a quantity of energy which is close to the first quantity of energy predicted at 202. In some implementations, the first quantity of funds can be "rounded up", overestimated, or otherwise inflated so as to almost certainly enable the first quantity of energy to be purchasable at charge station 330 using the first quantity of funds.

At 212, a determination is made (by the at least one processor 114) as to whether a sufficient quantity of funds (at least the first quantity of funds) are available for an account associated with user device 322. For example, a credit card number of the user may be stored, and a determination is made as to whether a sufficient quantity of funds can be charged to the credit card. In another example, the user may maintain a deposit, line of credit, retainer, or similar for their account, and in act 212 a determination is made as to whether sufficient funds are available under this deposit, line of credit, retainer, or similar.

If sufficient funds are determined to be available at 212, then method 200 proceeds to 216. If sufficient funds are not determined to be available at 212, method 200 proceeds to 214. At 214, the preauthorization amount is limited. In some examples, this means the preauthorization is limited to zero (i.e., is denied entirely). In such examples, method 200 ends, as no preauthorization is available. In other examples, the preauthorization amount (i.e. the first quantity of funds) is limited to an amount which is available to the account associated with the user. In such examples, method 200 proceeds to 216.

At 216, a first signed receipt is generated (by the at least one processor 114 of payment management device 110), and sent to user device 322 (by communication interface 118). The first signed receipt indicates availability of the first quantity of funds to purchase energy (including in cases where the first quantity of funds is limited at 214).

At 220, the user device 322 receives the first signed receipt (by a communication interface 128), and stores the first signed receipt (on at least one non-transitory processor-readable storage medium 126).

As mentioned earlier, with reference to the example illustrated in FIG. 3, method 200 up to this point is performed at time t1 (or within a time period t1). After act 220, vehicle 320 leaves communication range 342, and is no longer in an internet or cellular service connected area. Vehicle 320 stops at charge station 330 to charge, which is outside an internet or cellular service area. As a result of this lack of service, electronic payments which rely on an internet connection are generally not possible. However, electronic payment is still possible by method 200 shown in FIG. 2 and discussed herein.

At 222, user device 322 sends (by a communication interface 128) the first signed receipt to charge station 330. At 230, the first signed receipt is received at charge station 330 (by a communication interface 138). The first signed receipt is processed (by at least one processor 134 of charge station 330), and if the signature of the first signed receipt is successfully verified, energy is provided to the vehicle battery at 232 (via an energy couple 139 of charge station 330). Energy provided at 232 is generally in accordance with the first quantity of funds indicated in the first signed receipt, but is not necessarily equal to the first quantity of energy, or necessarily limited to energy purchasable by the first quantity of funds, as discussed below.

At 234, a second amount of energy provided to the vehicle battery is determined (by at least one processor 134 of charge station 330). In some cases, the second amount of energy equals the first amount of energy. For example, the predicted first quantity of energy may be accurate to the charging needs of the vehicle, such that the vehicle battery is charged by the first quantity of energy at 232. In another example, even if the first quantity of energy is not completely accurate to the charging needs of the vehicle, since the payment preauthorization corresponds to the first quantity of energy, the vehicle battery is charged by the first quantity of energy at 232. In other cases, the second amount of energy is different from the first amount of energy. For example, prediction of the first quantity of energy at 202 can be biased to be "safe"; i.e. the predicted first quantity of energy can be deliberately determined to be greater than what the vehicle battery would actually need to meet its charging needs, so that the preauthorized payment amount (the first quantity of funds) will be greater than what actually needs to be charged. In such cases, the second quantity of energy is less than the first quantity of energy. In other cases, the second quantity of energy may be greater than the first quantity of energy. For example, for a user account in good standing (based on previous history of the account), the second quantity of energy may be permitted to exceed the first quantity of energy by a "trust threshold". That is, for a user who is trusted, they may be allowed to charge their vehicle battery beyond a preauthorized payment amount, up to a certain threshold (the trust threshold). Such a trust threshold can be based on energy quantity (i.e. energy used to charge the battery can exceed the first quantity of energy by a trust threshold amount of energy), or based on funds (i.e. amount funds to purchase energy can exceed the first quantity of funds by a trust threshold amount of funds). In some cases, the first quantity of energy may differ from the second quantity of energy due to a difference in actual energy price versus energy price used to determine the first quantity of funds. For example, if a first quantity of funds is preauthorized to purchase the first quantity of energy, and the energy price at charge station 330 is different than expected, then energy corresponding to the first quantity of funds can be provided to the battery, but this provided quantity of energy (second quantity of energy) does not match the first quantity of energy.

At 236, charge station 330 produces a second signed receipt (e.g. by the at least one processor 134) indicating a second quantity of funds to purchase the second quantity of energy. The second signed receipt serves to indicate how much energy is actually used to charge the vehicle battery (or what quantity of funds are needed to purchase the second quantity of energy actually provided to the vehicle battery), so the user pays an accurate amount. In cases where the second quantity of energy is less than the first quantity of energy (or second quantity of funds is less than the first quantity of funds), this is useful to release an excess portion of the preauthorized payment amount (first quantity of funds) to the user. In cases where the second quantity of energy is equal to the first quantity of energy (or the second quantity of funds is equal to the first quantity of funds), the second signed receipt serves to confirm that the preauthorized payment amount (first quantity of funds) is accurate. In cases where the second quantity of energy is greater than the first quantity of energy (or the second quantity of funds exceeds the first quantity of funds), the second signed receipt serves to indicate an amount owing by the user so that an accurate amount of funds can be collected. In some implementations, the second signed receipt indicates the second quantity of funds as a total quantity of funds to purchase the energy provided to charge the vehicle battery. In this scenario, a transaction for the second quantity of funds is processed (by payment management device 110 as discussed later), and the preauthorized payment amount is refunded or released back to the user. In other implementations, the second signed receipt can indicate a difference between the first quantity of funds and the second quantity of funds. In this way, the preauthorized payment amount can itself be processed as a payment (by payment management device 110), and a second transaction can later be processed (by payment management device 110 as discussed later) based on the second signed receipt as an adjustment (e.g. a refund or an additional charge) to account for the difference between the first quantity of funds and the second quantity of funds.

Processing the preauthorized payment amount (first quantity of funds) as a payment, then processing a second transaction based on the second signed receipt, advantageously reduces risk for the energy provider, because two separate smaller payments are less likely to be declined or rejected than a large single payment. Further, if one of the payments is declined, losses for the energy provider are less than if a large single transaction is declined.

At 236, the second signed receipt is sent to the user device 322 (e.g. by communication interface 138). At 240, the second signed receipt is received by user device 322 (e.g. by communication interface 128).

As mentioned earlier, with reference to the example illustrated in FIG. 3, method 200 from act 222 to act 240 is performed at time t2 (or within a time period t2). After act 240, vehicle 320 departs from charge station 330, and eventually reenters an internet or cellular service area (show as communication range 346 of cellular communication tower 344, which marks time t3 (or a start of a time period t3), during which the remaining acts of method 200 are performed.

At 242, user device 322 sends the second signed receipt to the payment management device 110 (e.g. by communication interface 128). Preferably, act 242 is performed automatically by user device 322, once connection to an internet or cellular communication network is identified. At 250, payment management device 110 receives the second signed receipt (e.g. by communication interface 118). At 252, payment management device 110 (e.g. by the at least one processor 114) processes the second signed receipt. That is, payment management device 110 balances the second quantity of funds to the account associated with user device 322. In cases where the second signed receipt indicates a second quantity of funds equal to the first quantity of funds (i.e. the second signed receipt is a confirmation of the transaction preauthorized in the first signed receipt), the transaction can be marked as completed, with no need for processing of adjustments, refunds, amounts owing, releasing of funds, or similar. In cases where the second quantity of funds exceeds the first quantity of funds, the payment management device 110 charges the second quantity of funds to the account associated with the user device (for example by releasing the preauthorized first quantity of funds and charging the second quantity of funds in a new transaction, or by charging a difference between the second quantity of funds and the first quantity of funds in an additional transaction). In cases where the second quantity of funds is less than the first quantity of funds, the payment management device 110 reimburses or releases funds to the account associated with the user device (for example by releasing the preauthorized first quantity of funds and charging the second quantity of funds in a new transaction, or by refunding or releasing a difference between the second quantity of funds and the first quantity of funds).

Figure 4:
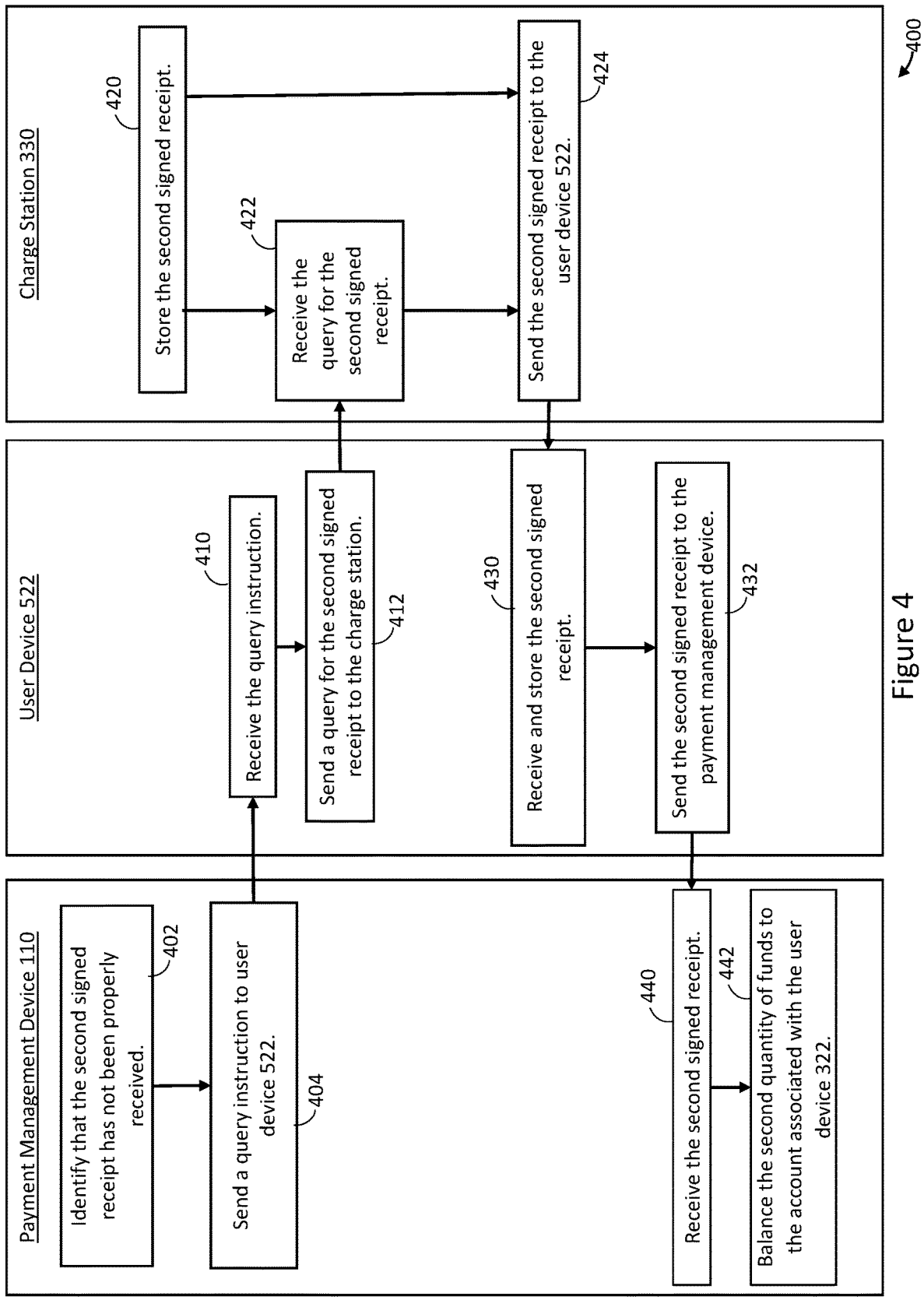
FIG. 4 is a flowchart diagram of a method for receiving a receipt for charging of a vehicle battery, in accordance with an exemplary illustrated implementation.
Figure 5:
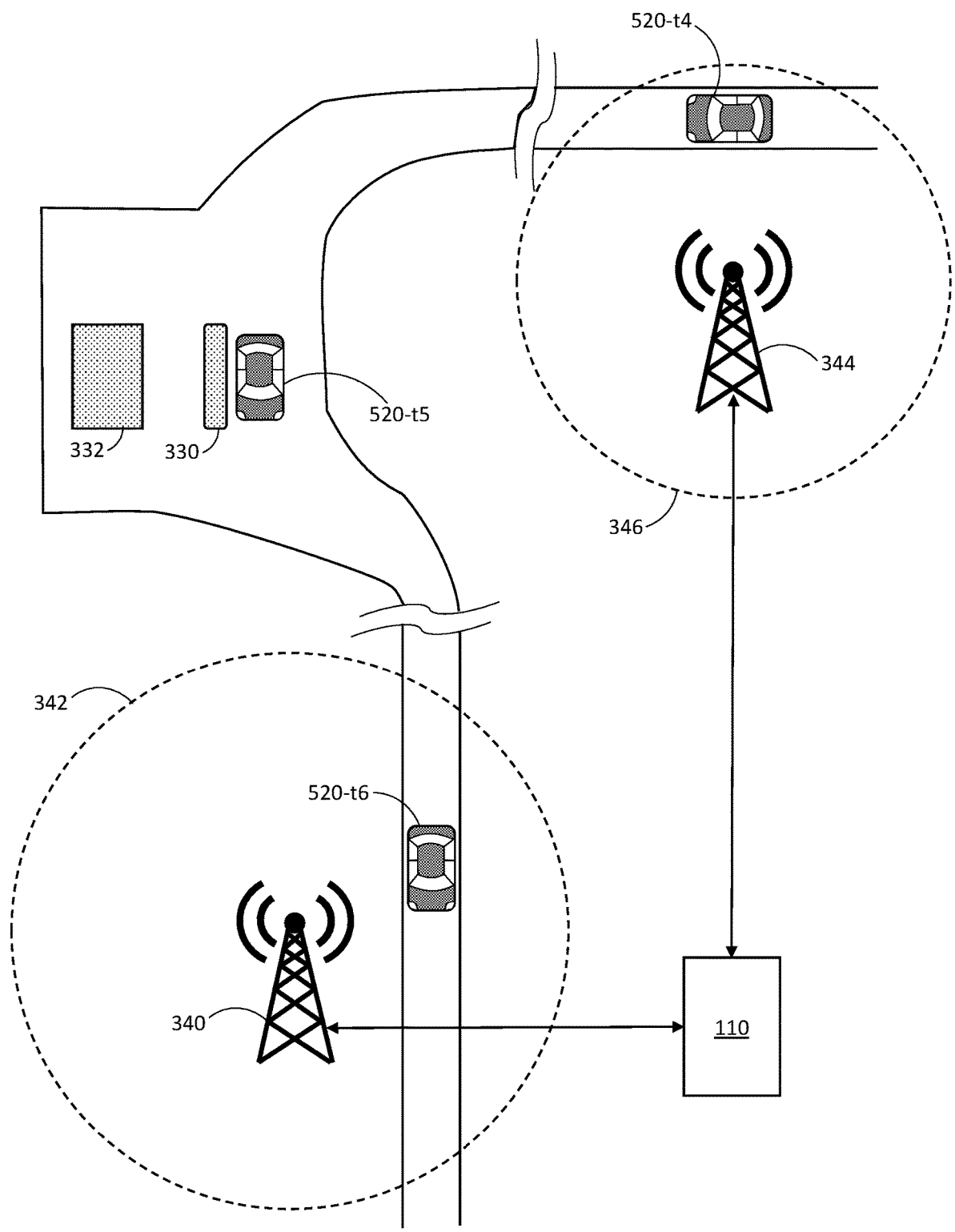
FIG. 5 is a top view of an exemplary scenario where a receipt for charging of a vehicle battery is received in accordance with an exemplary illustrated implementation.

In some scenarios, the second signed receipt may not be sent to the payment management device 110 in act 242 (or sending may be delayed). For example, the vehicle 320 may not return to an internet or cellular connected region (e.g. if the vehicle is abandoned). As another example, the user device 322 may lose the ability to connect to the internet or cellular network (e.g. if user device 322 is damaged, lost, or otherwise compromised). As yet another example, the second signed receipt could be lost or compromised (e.g. if data on at least one transitory processor-readable storage medium 126 of the user device 322 is deleted, lost, corrupted, or otherwise compromised). In other scenarios, the second signed receipt may not be properly received by the payment management device 110. For example, transmission of the second signed receipt may result in at least partial loss or corruption of data. In any of these cases, it is desirable to provide alternative means for the payment management device 110 to receive the second signed receipt. FIGS. 4 and 5 discussed below provide such an alternative means.

FIG. 4 is a flowchart diagram which illustrates an exemplary method 400 performed by devices such as those in FIG. 1. Method 400 as illustrated includes acts 402, 404, 410, 412, 420, 422, 424, 430, 432, 440, and 442. One skilled in the art will appreciate that additional acts could be added, acts could be removed, or acts could be reordered as appropriate for a given application. With reference to the example illustrated in FIG. 1, acts can be performed by appropriate components of payment management device 110, user devices 122, and charge stations 130. In particular, FIG. 4 illustrates interaction and communication between payment management device 110, a user device 522 (which is similar to and can include components of any of the user devices 122 discussed with reference to FIG. 1), and charge station 330 (which is similar to and can include components of any of the charge stations 130 discussed with reference to FIG. 1). Further, any of the at least one non-transitory processor-readable storage mediums 116, 126, or 136 could have instructions stored thereon, which when executed by a respective at least one processor (processors 114, 124, or 134) cause the respective device (payment management device 110, user device 522, or charge station 330) to perform a given act of method 400. Method 400 is generally directed to resolving a receipt which is not received properly or not handled by payment management device 110 in the context of method 200. That is, method 400 can be performed if there is a failure in any of acts 240, 242, 250, or 252 of method 200.

Method 400 in FIG. 4 is discussed with reference to an example scenario illustrated in FIG. 5. FIG. 5 is similar to FIG. 3 discussed above, and description of FIG. 3 is applicable to FIG. 5 unless context dictates otherwise. One difference between FIG. 5 and FIG. 3 is that in FIG. 5, a different vehicle 520 is shown, which carries a different user device from that shown in FIG. 3. Vehicle 520 is shown at three times t4, t5, and t6 (labelled as 520-*t*4, 520-*t*5, and 520-*t*6, respectively, in FIG. 5). At t4, cellular connectivity is available to vehicle 520 (and a user device 522 thereat), because vehicle 520 is within a communication range 346 of a cellular communication tower 346. At t5 cellular connectivity is NOT available to vehicle 520 (and user device 522 thereat), because vehicle 520 is outside of communication range of any cellular communication towers. At t6 cellular connectivity is again available to vehicle 520 (and a user device thereat), because vehicle 520 is within a communication range 342 of cellular communication tower 340. FIGS. 4 and 5 generally discuss a process by which the second signed receipt can be delivered to the payment management device 110, via a different user device (user device 522) from the user device which handles the first signed receipt (user device 322).

At 402, the payment management device 110 (e.g. by the at least one processor 114) identifies that the second signed receipt has not been properly received. For example, when issuing the first signed receipt, the payment management device may set a timer for a first duration. If the payment management device has not received a resolution to the first signed receipt (e.g. the second signed receipt, or a message cancelling the first signed receipt), within the first duration, the payment management device may flag the second signed receipt as not being properly received, and proceed with the rest of method 400.

At 404, the payment management device 110 sends a query instruction (by communication interface 118) to user device 522 (which is carried by vehicle 520 in FIG. 5, though not illustrated in FIG. 5 to reduce clutter). At 410, user device 522 receives the query instruction (by communication interface 128).

Acts 402, 404, and 410 generally occur within or prior to time t4, when the vehicle 520 has access to internet or cellular communication. After 410, vehicle 520 leaves the cellular or internet service area, and arrives at charge station 330 at time t5. Vehicle 520 for example could stop to charge, or could stop near charge station 330 for any other reason.

At 412, during t5, user device 522 carried by vehicle 520 sends a query for the second signed receipt to the charge station 330 (by communication interface 128). At 422, charge station 330 receives the query for the second signed receipt (by communication interface 138).

At 424 charge station 330 sends the second signed receipt to the user device 522 (by communication interface 138). At 430, user device 522 receives the second signed receipt (by communication interface 128), and stores the second signed receipt (by at least one non-transitory processor-readable storage medium 126).

Acts 412, 422, 424, and 430 generally occur within time t5, when the vehicle 520 is positioned within communication range of charge station 330.

After t5, vehicle 520 departs from charge station 330, and enters an internet or cellular service region (in the example of FIG. 5, within communication range 342 of cellular communication tower 340), illustrated at time t6. During t6, at 432, user device 522 carried by vehicle 520 sends the second signed receipt to the payment management device 110 (by communication interface 128). At 440 the payment management device 110 receives the second signed receipt from the user device 522 (by communication interface 118).

At 442, with the second signed receipt received at the payment management device 110, payment management device 110 processes the second signed receipt (by the at least one processor 114). That is, payment management device 110 balances the second quantity of funds to the account associated with user device 322 discussed with reference to FIGS. 2 and 3. Act 442 in method 400 is similar to act 252 in method 200 discussed earlier. Description of act 252 is fully applicable to act 442, and is not repeated for brevity.

In order to provide the second signed receipt to user device 522, the second signed receipt is stored at the charge station 330 (by at least one non-transitory processor-readable storage medium 136), when the second signed receipt is prepared in the context of method 200. This is shown at 420 in FIG. 4.

Selection of the user device 522 to which the query instruction is sent can be performed in a number of different ways.

In one exemplary implementation, a user of user device 522 (and vehicle 520) may indicate an intention to charge, thus initiating method 200 for user device 522 and vehicle 520. Taking advantage of this, payment management device 110 can initiate method 400, to use user device 522 to recover at least one unresolved signed receipt for another user device. This could be performed for a plurality of vehicles, user devices, or signed receipts. For example, when payment management device 110 learns that a vehicle will approach charge station 330 (as in the case where a user of user device 522 and vehicle 520 indicates an intention to charge at charge station 330), payment management device 110 can send a query instruction to user device 522 at act 404, to cause user device to query the charge station 330 for any unresolved receipts (as in method 400).

In another exemplary implementation, payment management device 110 may take advantage of any user devices which have potential to approach charge station 330, even without certainty or a strong indication that said user devices 522 will actually approach charge station 330. For example, method 400 can be performed with respect to any user devices within a geographic region around charge station 330. In this way, payment management device 110 sends the query instructions at 404 to any vehicles which may be able to query charge station 330. Eventually, at least one such vehicle will approach charge station 330, such that the remainder of method 400 can be carried out in order for payment management device 110 to receive the second signed receipt.

In some implementations, acts 402, 404, 410, 412, and 422 are optional. In particular, instead of querying other user devices to retrieve the second signed receipt, this process can happen automatically. As shown in FIG. 4, after charge station 330 stores the second signed receipt at 420, charge station 420 can send the second signed receipt to the user device 522, even if not in response to a query. In such an implementation, in addition to a user device for which the first signed receipt is issued (user device 322 in method 200), the second signed receipt is automatically sent to a backup device (user device 522), so as to ensure the second signed receipt is sent to payment management device 110 even if the user device 322 of method 200 fails to do so.

In some implementations, if a receipt is not resolved within a certain period of time, or within a certain number of attempts (e.g., if the payment management device 110 does not receive the second signed receipt after several days, a week, a month, or any other appropriate length of time, or if the payment management device has sent out a certain number of query instructions for the second signed receipt as in method 400), the payment management device 110 can complete the transaction by charging the first amount of funds pre-authorized in act 216 of method 200. If the first quantity of funds is overestimated, this will typically overcharge the user, and thus acts as incentive for the user to ensure that the second signed receipt is sent.

Method 400 can also be used to verify cancellation of a preauthorization by a user. For example, after receiving the first signed receipt at the user device 322 in act 220 of method 200, the user may decide that they no longer need or want to charge using the preauthorized amount. The user may input a request to cancel the preauthorization via a user interface of the user device 322. This request to cancel the preauthorization (first signed receipt) is sent from user device 322 to payment management device 110 (via communication interfaces 118 and 138). In response to receiving the request to cancel the preauthorization, payment management device 110 can initiate method 400 in FIG. 4, starting at act 404, to query charge station 330 for a second signed receipt, via user device 522. That is, payment management device 110 can check whether there is a second signed receipt at charge station 330 corresponding to the preauthorization (first signed receipt) that the user of user device 322 is requesting to be cancelled. This is useful to prevent fraud, where the user of user device 322 charges their vehicle battery in accordance with method 200 (up to at least act 234), but cancels the preauthorization prior to the second signed receipt being sent to the payment management device 110 at act 242. If the second signed receipt is found at charge station 330, method 400 proceeds such that the second signed receipt is delivered to payment management device 110. If the second signed receipt is not found at charge station 330, user device 522 sends a message to payment management device (when possible) indicating such, and payment management device 110 cancels the payment preauthorization in accordance with the request of user device 322.

Figure 6:
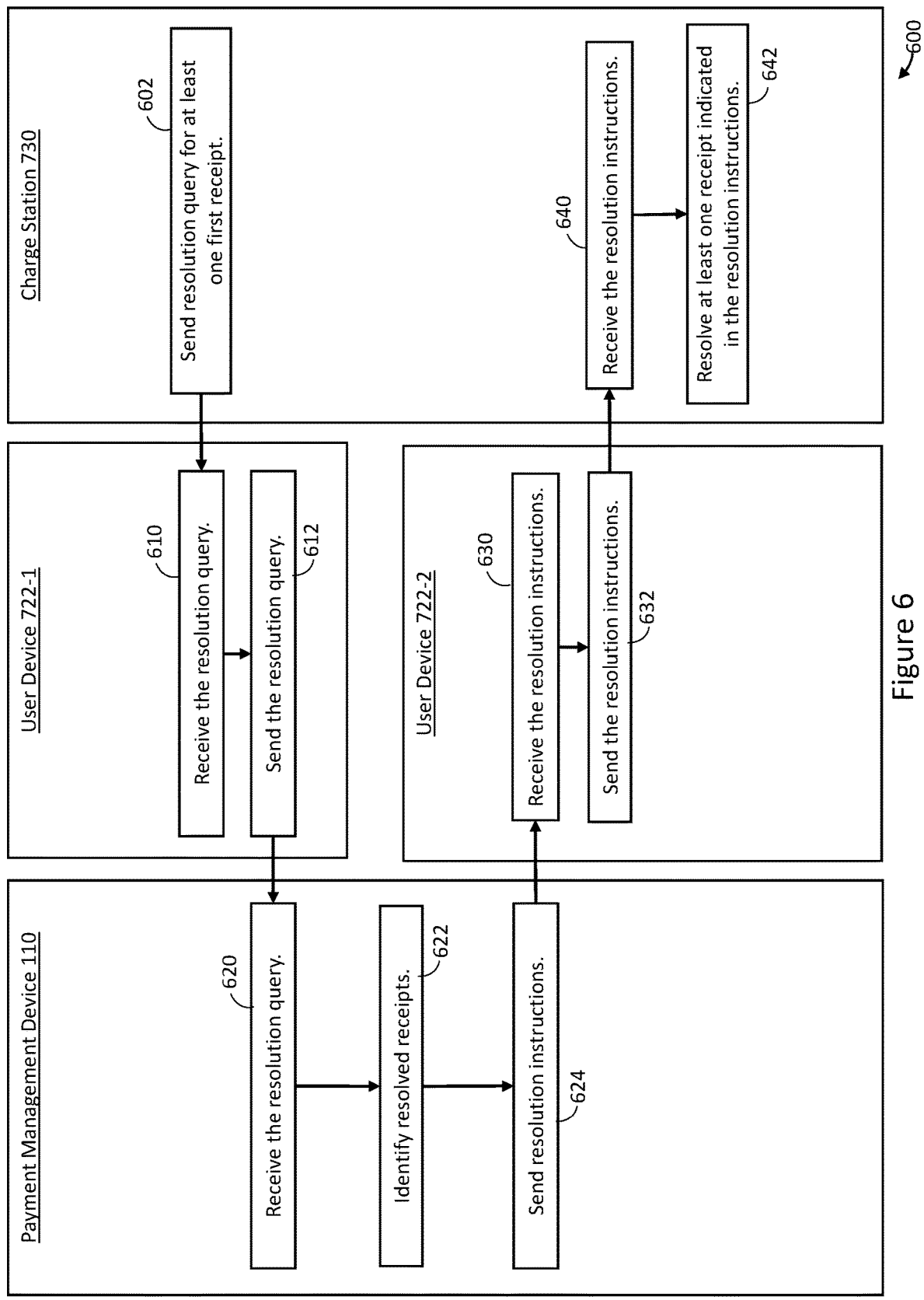
FIG. 6 is a flowchart diagram of a method for resolving receipts stored at a charge station, in accordance with an exemplary illustrated implementation.

FIG. 6 is a flowchart diagram which illustrates an exemplary method 600 performed by devices such as those in FIG. 1. Method 600 as illustrated includes acts 602, 610, 612, 620, 622, 624, 630, 632, 640, and 642. One skilled in the art will appreciate that additional acts could be added, acts could be removed, or acts could be reordered as appropriate for a given application. With reference to the example illustrated in FIG. 1, acts can be performed by appropriate components of payment management device 110, user devices 122, and charge stations 130. Further, any of the at least one non-transitory processor-readable storage mediums 116, 126, or 136 could have instructions stored thereon, which when executed by a respective at least one processor (processors 114, 124, or 134) cause the respective device (payment management device 110, user devices 122, or charge stations 130) to perform a given act of method 600.

Method 600 is generally directed to resolving receipts stored at a charge station which does not have internet or cellular access. In particular, as discussed above, a charge station can store a second signed receipt when a vehicle charges at the charge station. It is desirable to communicate to the charge station what receipts have been resolved (i.e., payment has been processed by payment management device 110), so that these receipts can safely be archived or cleared from storage at the charge station.

At 602, the charge station 730 sends a resolution query (by communication interface 138) for at least one receipt to a first user device 722-1, which is within communication range or communicatively coupled to charge station 730. At 610, the first user device 722-1 receives the resolution query (by a communication interface 128 thereof). In this context, a "resolution query" refers to a query by a charge station (charge station 730 in the illustrated example) to ascertain resolution status of at least one receipt (i.e. whether payment has been fully processed for said at least one receipt).

After act 610, user device 722-1 departs from charge station 730, and enters internet or cellular communication. User device 722-1 then sends the resolution query to payment management device 110 at 612 (by a communication interface 128 thereof). At 620, payment management device 110 receives the resolution query (by communication interface 118).

At 622, payment management device 110 identifies (by at least one processor 114) resolved receipts specified in the resolution query. That is, payment management device 110 identifies receipts indicated in the resolution query for which payment has already been processed.

At 624, payment management device 11 sends (by communication interface 118) resolution instructions for the at least one receipt identified at 622. In this context, "resolution instructions" can refer to a message or notification which indicates which receipts have been resolved, so that charge station 730 can mark as resolved, archive, or delete said receipts from storage (once charge station 730 eventually receives the resolution instructions through method 600 as discussed below). At 630, another user device 722-2 receives the resolution instructions. User device 722-2 is a user device which is carried by a vehicle which will or may approach charge station 730 in the future, and thus has the potential to relay the resolution instructions to charge station 730. Selection of a user device 722-2 (or a plurality of user devices which may act as user device 722-2) can be performed similarly to as discussed above with reference to FIG. 4.

When user device 722-2 arrives at charge station 730 (i.e. within communication range, or otherwise communicatively coupled thereto), at 632 user device 722-2 sends the resolution instructions to charge station 730 (by a communication interface 128 thereof).

At 640, charge station 730 receives (by communication interface 138) the resolution instructions from user device 722-2. At 642, at least one processor 134 of charge station 730 resolves at least one receipt indicated in the resolution instructions. That is, any receipts which are indicated as "resolved" in the resolution instructions are also "resolved" by the at least one processor 134 of charge station 730. "Resolving" at least one receipt can include marking the receipt as resolved, archiving the receipt, and/or deleting the receipt from storage at charge station 730.

FIG. 6 illustrates a method where charge station 730 "piggybacks" messages to and from payment management device 110 via user devices 722-1 and 722-2, to resolve receipts stored at charge station 730. That is, user devices 722-1 and 722-2 are used as means for indirect communication between charge station 730 and payment management device 110. A similar process could be used for many other reasons, such as the non-limiting example discussed below.

In one example, charge station 730 could send a firmware or software status message to payment management device 110, via user device 722-1 (in a similar manner to how a resolution query in FIG. 6 is relayed from charge station 730 to payment management device 110 in acts 602, 610, 612, and 620, by communication interfaces 138, 128, and 118). The firmware or software status message can indicate a firmware or software version for charge station 730 (or modules thereof). User device 722-1 relays the status to payment management device 110. Payment management device 110 (by the at least one processor 114) determines whether a firmware or software update should be applied to charge station 730 (e.g. if the firmware or software version in the status message is out of date). If an update is appropriate, payment management device 110 can send at least one update file to charge station 730 via user device 722-2, which in turn relays the update files to charge station 730 (similar to how the resolution instructions in FIG. 6 are relayed from payment management device 110 to charge station 730 in acts 624, 630, 632, and 640, by communication interfaces 118, 128, and 138). Charge station then applies or installs the update based on the received at least one update file.

In another example, charge station 730 can send updates or requests to payment management device 110 in a status message. For example, if the energy which charge station 730 provides to vehicle batteries is itself stored in a large battery (or is generated by use of a consumable fuel source at charge station 730), and this battery (or fuel source) runs low, charge station 730 can send a status message indicating this to payment management device 110 (via user device 722-1). An energy supplier (e.g. a mobile battery, battery replacement service, or fuel replenishment service) can come and provide energy (or fuel) to charge station 730.

Figure 7:
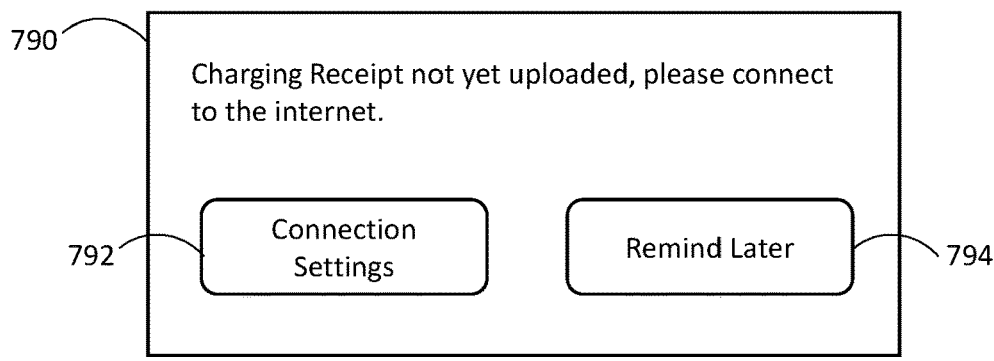
FIG. 7 is an interface diagram of an exemplary user interface for informing a user to enable sending of a receipt, in accordance with an exemplary implementation.

FIG. 7 illustrates an exemplary user interface 790 for reminding a user to enable sending of the second signed receipt. Interface 790 could be displayed by a display of user devices 122 or 322 for example, if a long time has passed since charging of a vehicle battery without sending of the second signed receipt. Determination of when to present user interface 790 can be performed entirely locally at a user device, so as to not be reliant on an internet or cellular connection. For example, with reference to method 200, if a specified duration has passed since user device 322 received the second signed receipt at 240, user device 322 can display interface 790 (or any other appropriate interface) to the user. In user interface 790, the user is reminded that the second signed receipt ("charging receipt" in FIG. 7) has not yet been uploaded, and the user is instructed to connect to the internet. Buttons 792 and 794 are also presented. If the user selects button 792, they are taken to connection settings, which allows the user to enable connection to the internet if possible (e.g. by selecting an available network, disabling airplane mode, or similar). The user can dismiss the notification be selecting button 794 (remind later), for example if the user is outside of a service area and internet or cellular connection is not possible. The exact messages and buttons illustrated in FIG. 7 are merely exemplary, and any appropriate user interface can be presented which reminds the user to enable sending of the second signed receipt to the payment management device 110.

Figure 8:
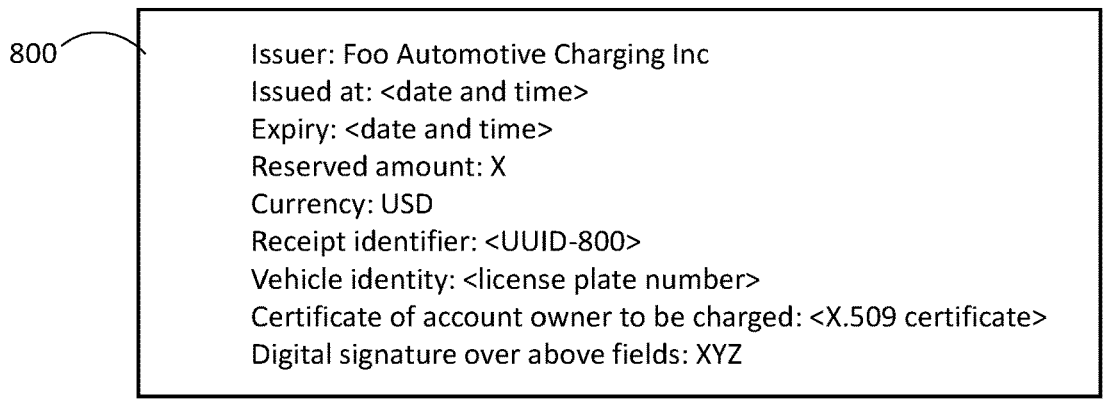
FIGS. 8 and 9 illustrate exemplary formats for signed receipts.

FIG. 8 illustrates an exemplary format for the first signed receipt discussed throughout this disclosure (or any other receipt issued to indicate a preauthorized amount or cost of energy to charge a vehicle battery). The exemplary first signed receipt is labelled as 800 in FIG. 8. Receipt 800 includes an Issuer Identifier (e.g. name or number); that is an identifier for the entity which provides the receipt 800 (and the corresponding preauthorization). Receipt 800 also shows a date and time of issuance for receipt 800, as well as an expiry date and time for receipt 800. Receipt 800 also indicates an amount of funds reserved (at act 216 of method 200) and a currency of said funds. Receipt 800 also includes an identifier, in this case a UUID (Universally Unique Invoice Identifier), shown as UUID-800 (a unique identifier for receipt 800). Receipt 800 as illustrated also includes an identifier for the vehicle to be charged (e.g. license plate number). Receipt 800 also includes a certificate of an account owner to be charged (to link the charge to the appropriate account). In the illustrated example, an X.509 certificate is included. In some cases, the included certificate is a complete instance of the certificate. In other cases, a secure reference to the certificate (e.g. a hash of the certificate) is included. Further, receipt 800 also includes a digital signature, so that authenticity of receipt 800 can be verified by a charge station before energy is provided to charge.

Figure 9:
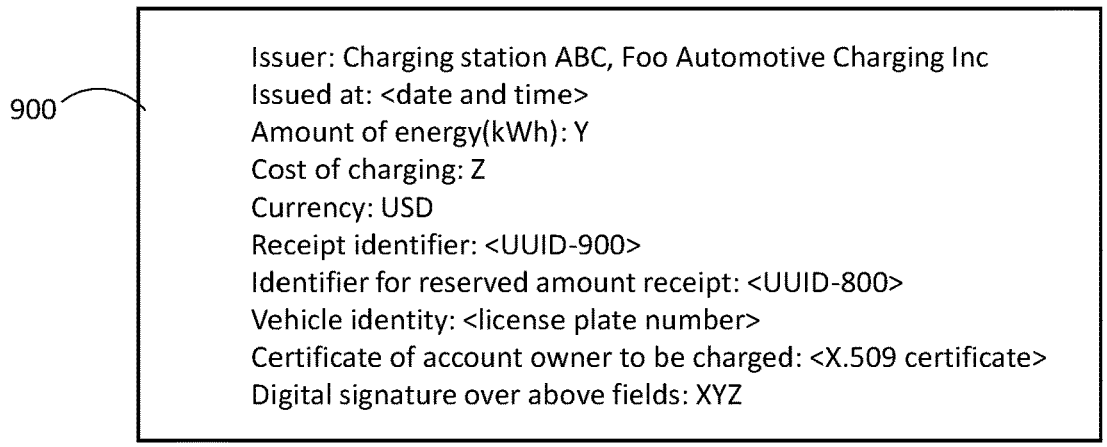

FIG. 9 illustrates an exemplary format for the second signed receipt discussed throughout this disclosure (or any other receipt issued to indicate an actual amount or cost of energy used to charge a vehicle battery). The exemplary second signed receipt is labelled as 900 in FIG. 9. Receipt 900 includes an Issuer Identifier (e.g. name or number); that is an identifier for the entity which provides the receipt 900. Since the second signed receipt is issued by a charge station when charging a vehicle battery, receipt 900 is also shown as including an identifier for the charge station which issues receipt 900. Receipt 900 also shows a date and time of issuance for receipt 900, as well as an expiry date and time for receipt 900. Since receipt 900 is a receipt for energy which has already been exchanged (in charging the vehicle battery), the second signed receipt may not expire (since it acts as a proof of transaction, rather than preauthorization for a transaction). Receipt 900 also indicates a cost of charging (second quantity of funds at act 236 of method 200) and a currency of said funds. Receipt 900 also includes an identifier, in this case a UUID, shown as UUID-900 (a unique identifier for receipt 900). Receipt 900 is also shown as included reference to the receipt 800, shown as identifier UUID-800. In this way the receipt 900 is associated with receipt 800, where receipt 900 shows an actual cost of energy to charge the vehicle battery whereas receipt 800 shows a preauthorized amount for charging the vehicle battery. Receipt 900 as illustrated also includes an identifier for the vehicle which received the charge (e.g. license plate number). Receipt 900 also includes a certificate of an account owner to be charged (to link the charge to the appropriate account). In the illustrated example, an X.509 certificate is included. In some cases, the included certificate is a complete instance of the certificate. In other cases, a secure reference to the certificate (e.g. a hash of the certificate) is included. Further, receipt 900 also includes a digital signature, so that authenticity of receipt 900 can be verified by payment management device upon receiving receipt 900.

What information is included in receipts 800 and/or 900 could be modified as appropriate for a given application. For example, receipts 800 or 900 could include any number of additional fields, if desired. Further, some fields could be removed as appropriate for a given application. For example, the vehicle identifier field could be removed, especially in cases where the user device which carries out the transaction is not strictly tied to a certain vehicle (such as when the user device is a smartphone of the user). As other examples, expiry date and time, or currency, could be removed, as these fields could be assumed or standardized (e.g. a receipt always expires one week after issue, or currency is always USD). Other permutations or combinations of fields in receipts 800 or 900 are within the scope of the present disclosure.

In an exemplary implementation, for generation of a first signed receipt (e.g. in act 216 of method 200), a charge station has one or more root certificates. The first signed receipt for payment preauthorization is signed (by the at least one processor 114 of payment management device 110) with a private key being part of a chain of trust of one of these root certificates. Payment management device 110 knows (e.g. via a lookup table stored at the at least one non-transitory processor-readable storage medium 116) what set of root certificates a given charge station owns, in order to sign a receipt with a private key being part of a chain of trust of a root certificate that the charge station can validate.

In another exemplary implementation, for generation of a second signed receipt (e.g. in act 236 of method 200), payment management device 110 has one or more root certificates. The second signed receipt for payment is signed (by the at least one processor 134 of charge station 330) with a private key being part of a chain of trust of one of these root certificates. Charge station 330 knows (e.g. via a lookup table stored at the at least one non-transitory processor-readable storage medium 136) what set of root certificates the payment management device 110 owns, in order to sign a receipt with a private key being part of a chain of trust of a root certificate that the payment management device 110 can validate.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device (e.g. payment management device 110, user device 122, or charge station 130) generally refers to the data information being stored at a non-transitory processor-readable storage medium of said device (e.g. non-transitory processor-readable storage mediums 116, 126, or 136).

What is claimed is:

1. A system for charging a vehicle battery, the system comprising:
   a payment management device comprising a first communication interface, at least one first processor, and at least one first non-transitory processor-readable storage medium communicatively coupled to the at least one first processor, the at least one first non-transitory processor-readable storage medium storing first processor-executable instructions which, when executed by the at least one first processor, cause the payment management device to:
receive, by the first communication interface from a user device, a request for payment preauthorization for a first quantity of energy;
determine, by the at least one first processor, that a first quantity of funds to purchase the first quantity of energy are available for an account associated with the user device; and
send, by the first communication interface, a first signed receipt indicating that the first quantity of funds are available to purchase the first quantity of energy, to be received by the user device; and a charge station comprising a second communication interface, at least one second processor, and at least one second non-transitory processor-readable storage medium communicatively coupled to the at least one second processor, the at least one second non-transitory processor-readable storage medium storing second processor-executable instructions which, when executed by the at least one second processor, cause the charge station to:
receive, by the second communication interface, the first signed receipt from the user device;
provide, via a power coupling, energy to the vehicle battery;
determine, by the at least one second processor, a second quantity of funds to purchase a second quantity of energy provided to the vehicle battery;
send, by the second communication interface to the user device, a second signed receipt indicating the second quantity of funds to purchase the second quantity of energy to charge the vehicle battery; and
store, by the at least one second non-transitory processor-readable storage medium, the second signed receipt, wherein the first processor-executable instructions further cause the payment management device to:
determine, by the at least one first processor, that the second signed receipt has not been received by the payment management device from the user device after a time period since issuance of the first signed receipt; and
send, by the first communication interface, a query instruction to another user device which causes the other user device to send a query to the charge station;

wherein the second processor-executable instructions further cause the charge station to:
receive, by the second communication interface, the query from the other user device; and
send, by the second communication interface, the second signed receipt to the other user device in response to the query, and wherein the first processor-executable instructions further cause the payment management device to:
after the vehicle battery is charged by the charge station and after the second signed receipt is sent to the other user device, receive, by the first communication interface from the other user device, the second signed receipt indicating the second quantity of funds to purchase the second quantity of energy used to charge the vehicle battery; and
balance the second quantity of funds to the account associated with the user device.

2. The system of claim 1, wherein the second quantity of funds is limited to be equal to or less than the first quantity of funds.

3. The system of claim 1, wherein the second quantity of funds is limited to be within a trust threshold of the first quantity of funds.

4. The system of claim 1, wherein:
the second quantity of energy is a quantity of energy in excess of the first quantity of energy; and
the second signed receipt indicates a difference between the first quantity of funds and the second quantity of funds.

5. The system of claim 4, wherein:
the first processor-executable instructions further cause the payment management device to charge the first quantity of funds to the account associated with the user device; and
the first processor executable instructions which cause the payment management device to balance the second quantity of funds to the account associated with the user device cause the payment management device to charge the second quantity of funds to the account associated with the user device.

6. The system of claim 1, wherein:
the second quantity of energy is a total quantity of energy used to charge the vehicle battery; and
the second signed receipt indicates the second quantity of funds to purchase the total quantity of energy used to charge the vehicle battery.

7. The system of claim 6, wherein the first processor-executable instructions which cause the payment management device to balance the second quantity of funds to the account associated with the user device cause the payment management device to, charge the second quantity of funds to the account associated with the user device.

8. The system of claim 7, wherein the first processor-executable instructions further cause the payment management device to release the first quantity of funds to the account associated with the user device.

9. The system of claim 1, wherein:
the second quantity of energy is a total quantity of energy used to charge the vehicle battery and is less than the first quantity of energy; and
the second signed receipt indicates a difference between the first quantity of funds and the second quantity of funds.

10. The system of claim 9 wherein:
the first processor-executable instructions further cause the payment management device to charge the first quantity of funds to the account associated with the user device; and
the first processor executable instructions which cause the payment management device to balance the second quantity of funds to the account associated with the user device cause the payment management device to reimburse the second quantity of funds to the account associated with the user device.

11. The system of claim 1, wherein the first signed receipt has an expiration time.

12. The system of claim 1, wherein it is not possible for the payment management device to communicate with the charge station in real-time over at least one communication network.

13. The system of claim 1, wherein:

the second processor-executable instructions further cause the charge station to send by the second communication interface to the user device, a status message; and the first processor-executable instructions further cause the payment management device to receive by the first communication interface from the user device, the status message.

14. The system of claim 13, wherein:

the status message indicates a firmware or software version of at least one module of the charge station;

in response to the firmware or software version being out of date, the first processor executable instructions further cause the payment management device to send a firmware or software update file to the other user device;

the second processor-executable instructions further cause the charge station to:

receive, by the second communication interface, the update file; and install, by the at least one second processor, the update file to the charge station.

15. The system of claim 13, wherein the status message indicates energy available at the charge station.

* * * * *